(12) United States Patent
Schwarz

(10) Patent No.: US 10,927,751 B2
(45) Date of Patent: Feb. 23, 2021

(54) INTERNAL COMBUSTION ENGINE

(71) Applicant: Bayerische Motoren Werke Aktiengesellschaft, Munich (DE)

(72) Inventor: Christian Schwarz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/713,285

(22) Filed: Dec. 13, 2019

(65) Prior Publication Data

US 2020/0116075 A1 Apr. 16, 2020

Related U.S. Application Data

(63) Continuation of application No. PCT/EP2018/063584, filed on May 24, 2018.

(30) Foreign Application Priority Data

Jun. 23, 2017 (DE) ..................... 10 2017 210 582.8

(51) Int. Cl.
*F02B 27/00* (2006.01)
*F02B 25/28* (2006.01)
(Continued)

(52) U.S. Cl.
CPC ............ *F02B 27/003* (2013.01); *F02B 25/28* (2013.01); *F02B 39/02* (2013.01); *F02D 41/0007* (2013.01); *F02D 41/1402* (2013.01)

(58) Field of Classification Search
CPC .............. F02B 2075/1832; F02B 25/28; F02B 27/003; F02B 37/004; F02B 37/007;
(Continued)

(56) References Cited

U.S. PATENT DOCUMENTS 6,237,335 B1 * 5/2001 Lonngvist ............... F02B 37/24
60/605.2
6,360,732 B1 * 3/2002 Bailey ................... F02B 37/025
123/568.12

(Continued)

FOREIGN PATENT DOCUMENTS

DE 10 2004 001 371 A1 8/2005
DE 10 2006 042 443 A1 3/2008
(Continued)

OTHER PUBLICATIONS

Translation of DE102006042443, 2006, Dusl Kurt (Year: 2006).*
(Continued)

*Primary Examiner* — Jesse S Bogue
(74) *Attorney, Agent, or Firm* — Crowell & Moring LLP

(57) ABSTRACT

A V-type internal combustion engine has a first cylinder bank with four first cylinders and a second cylinder bank with four second cylinders. A first fresh gas line is provided for the first cylinder bank and a second fresh gas line for the second cylinder bank. An exhaust gas system has a first turbocharger, which has a first compressor and a first turbine having two first exhaust gas inlets, and a second turbocharger, which has a second compressor and a second turbine having two second exhaust gas inlets. The first fresh gas line is connectable to the first four cylinders downstream of the first compressor in the flow direction of a fresh gas so as to conduct fresh gas, and the second fresh gas line is connectable to the second four cylinders downstream of the second compressor in the flow direction of the fresh gas so as to conduct fresh gas. A first cylinder and a second cylinder can be connected via the exhaust gas system to the first first exhaust gas inlet, a first cylinder and a second cylinder can be connected via the exhaust system to the second first exhaust gas inlet, a first cylinder and a second cylinder can be connected via the exhaust gas system to the first second
(Continued)

exhaust gas inlet, and a first cylinder and a second cylinder can be connected via the exhaust gas system to the second second exhaust gas inlet. A single third compressor is arranged in the first fresh gas line between the first compressor and the first four cylinders.

8 Claims, 2 Drawing Sheets

(51) Int. Cl.
    *F02B 39/02* (2006.01)
    *F02D 41/00* (2006.01)
    *F02D 41/14* (2006.01)

(58) Field of Classification Search
    CPC ........ F02B 37/025; F02B 37/04; F02B 39/02; F02B 39/04; F02B 39/10; F02B 75/22; F02D 41/0007; F02D 41/1402; Y02T 10/12
    See application file for complete search history.

(56) References Cited

U.S. PATENT DOCUMENTS

| | | | | |
|---|---|---|---|---|
| 6,694,736 | B2* | 2/2004 | Pfluger | F02B 37/24 60/612 |
| 8,096,124 | B2* | 1/2012 | Pierpont | F02B 37/001 60/605.2 |
| 9,835,082 | B2* | 12/2017 | VanDerWege | F02D 41/0007 |
| 10,196,967 | B2* | 2/2019 | Rutschmann | F02B 37/04 |
| 2009/0183506 | A1* | 7/2009 | Trombetta | F02B 37/004 60/599 |
| 2010/0031905 | A1 | 2/2010 | Schwarz et al. | |
| 2014/0298799 | A1 | 10/2014 | Wu et al. | |

FOREIGN PATENT DOCUMENTS

| | | | |
|---|---|---|---|
| DE | 10 2006 042 464 A1 | 3/2008 | |
| DE | 102006042443 A1 * | 3/2008 | ............. F02B 37/22 |
| DE | 10 2008 055 896 A1 | 5/2010 | |
| DE | 10 2010 055 059 A1 | 6/2012 | |
| DE | 10 2012 103 013 A1 | 10/2013 | |
| DE | 10 2014 104 402 A1 | 10/2014 | |
| EP | 2 115 284 B1 | 8/2010 | |
| JP | 3-151519 A | 6/1991 | |
| WO | WO 02/38619 A1 | 5/2002 | |

OTHER PUBLICATIONS

International Search Report (PCT/ISA/210) issued in PCT Application No. PCT/EP2018/063584 dated Jul. 4, 2018 with English translation (six pages).

German-language Written Opinion (PCT/ISA/237) issued in PCT Application No. PCT/EP2018/063584 dated Jul. 4, 2018 (eight pages).

German-language Search Report issued in counterpart German Application No. 10 2017 210 582.8 dated Mar. 9, 2018 with partial English translation (12 pages).

Cover page of EP 1 355 952 A1 published Oct. 29, 2003 (one page).

* cited by examiner

INTERNAL COMBUSTION ENGINE

CROSS REFERENCE TO RELATED APPLICATIONS

This application is a continuation of PCT International Application No. PCT/EP2018/063584, filed May 24, 2018, which claims priority under 35 U.S.C. § 119 from German Patent Application No. 10 2017 210 582.8, filed Jun. 23, 2017, the entire disclosures of which are herein expressly incorporated by reference.

BACKGROUND AND SUMMARY OF THE INVENTION

The invention relates to an internal combustion engine of V-type construction.

With regard to the technical field, reference is made for example to European patent application EP 1 355 952 A1. This document discloses a supercharging system for an internal combustion engine, in the case of which an electrically operated supercharging blower is arranged upstream or downstream of an exhaust-gas turbocharger for the purposes of actively increasing the charge pressure. A bypass line for bypassing the supercharging blower can be selectively opened or closed by a bypass flap. A closed-loop control ensures that, when the supercharging blower is inactive, a part of the charge air is conducted via said supercharging blower and thus an idle rotational speed of the supercharging blower is maintained, thus enabling it to start up more quickly.

A disadvantage of this known embodiment is that the exhaust manifolds are arranged to both sides of the internal combustion engine, giving rise to a considerable structural space requirement.

Furthermore, German laid-open specification DE 10 2004 001 371 A1 discloses an internal combustion engine with an exhaust-gas recirculation arrangement. The internal combustion engine has an intake line with an inlet-side intake compressor and with a recirculation line belonging to the exhaust-gas recirculation arrangement, which recirculation line is connected via an opening-in point to the intake line. An additional compressor is provided which is positioned in series with respect to the intake compressor and upstream of the opening-in point, the function of which additional compressor can be reversed for expander operation. The internal combustion engine known from this laid-open specification has an exhaust manifold in the hot V, which correspondingly saves structural space.

A disadvantage of this known embodiment is, however, that the intake lines for each cylinder bank must be charged with compressed air by the additional compressor. This takes away a considerable amount of structural space again.

Furthermore, European patent EP 2 115 284 B1, on which the present invention is based, discloses an internal combustion engine with eight cylinders in a V-type construction, having an exhaust system with a first and a second exhaust-gas turbocharger. Here, a first, a second, a third and a fourth cylinder, which are arranged adjacent to one another in an in-line arrangement, form a first cylinder bank, and a fifth, a sixth, a seventh and an eighth cylinder, which are arranged adjacent to one another in an in-line arrangement, form a second cylinder bank which is situated opposite the first cylinder bank. The internal combustion engine has an ignition sequence of 90° crank angle from cylinder to cylinder. The exhaust system has a first, a second, a third and a fourth exhaust tract from the cylinders to the two exhaust-gas turbochargers, wherein in each case two cylinders are assigned to one exhaust tract, and in each case one exhaust-gas turbocharger is assigned to two exhaust tracts, wherein two cylinders assigned to one exhaust tract have an ignition interval of 360° crank angle, and wherein the first and the second exhaust tract assigned to an exhaust-gas turbocharger have an ignition sequence offset with respect to one another by 180° crank angle.

Even if this prior art has no direct disadvantage, the invention is based on the object of once again considerably improving the response characteristics of the supercharging assembly (response), with an extremely small packaging requirement and extremely low costs.

According to an embodiment of the invention, an internal combustion engine of V-type construction has a first cylinder bank with four first cylinders and a second cylinder bank with four second cylinders, a first fresh-gas line for the first cylinder bank and a second fresh-gas line for the second cylinder bank, an exhaust system with a first exhaust-gas turbocharger with a first compressor and a first turbine with two first exhaust-gas inlets and a second exhaust-gas turbocharger with a second compressor and a second turbine with two second exhaust-gas inlets. The first fresh-gas line is, downstream of the first compressor in a flow direction of a fresh gas, connectable in fresh-gas-conducting fashion to the first four cylinders. The the second fresh-gas line is, downstream of the second compressor in the flow direction of the fresh gas, connectable in fresh-gas-conducting fashion to the second four cylinders. A first cylinder and a second cylinder are connectable in exhaust-gas-conducting fashion via the exhaust system to the first first exhaust-gas inlet. A first cylinder and a second cylinder are connectable in exhaust-gas-conducting fashion via the exhaust system to the second first exhaust-gas inlet. A first cylinder and a second cylinder are connectable in exhaust-gas-conducting fashion via the exhaust system to the first second exhaust-gas inlet. A first cylinder and a second cylinder are connectable in exhaust-gas-conducting fashion via the exhaust system to the second second exhaust-gas inlet. And, a single third compressor is arranged in the first fresh-gas line, between the first compressor and the first four cylinders.

Accordingly, the response of the supercharging assembly is advantageously significantly improved, wherein only a single further compressor is required. This saves costs and considerable packaging requirement.

According to an aspect of the invention, the third compressor has a bypass. This makes it possible for the third compressor to be bypassed in the presence of high loads and high speeds of the internal combustion engine, in order to avoid pressure losses.

According to a further aspect of the invention, the throttle element is a arranged in the bypass. Thus, the air mass flow through the third compressor and the bypass can be controlled in open-loop or closed-loop fashion.

According to further aspects of the invention, a first charge-air cooler is arranged in the first fresh-gas line between the third compressor and the first four cylinders. A second charge-air cooler may be arranged in the second fresh-gas line between the second compressor and the four second cylinders. Accordingly, a significantly higher degree of charging of the cylinders is possible, which has a positive effect on the power of the internal combustion engine.

In yet another aspect of the invention, a first check valve is arranged in the first fresh-gas line between the first charge-air cooler and the four first cylinders. A second check valve may be arranged in the second fresh-gas line between the second charge-air cooler and the four second cylinders. Accordingly, a backflow of the fresh air caused by the charge exchange is prevented.

According to a further aspect of the invention, the third compressor can preferably be driven electrically and/or mechanically. The third compressor is particularly preferably an electrical compressor operable with a voltage of 48 V.

Other objects, advantages and novel features of the present invention will become apparent from the following detailed description of one or more preferred embodiments when considered in conjunction with the accompanying drawings.

DETAILED DESCRIPTION OF THE DRAWINGS

Below, identical components in the two figures are denoted by the same reference designations.

Figure 1:
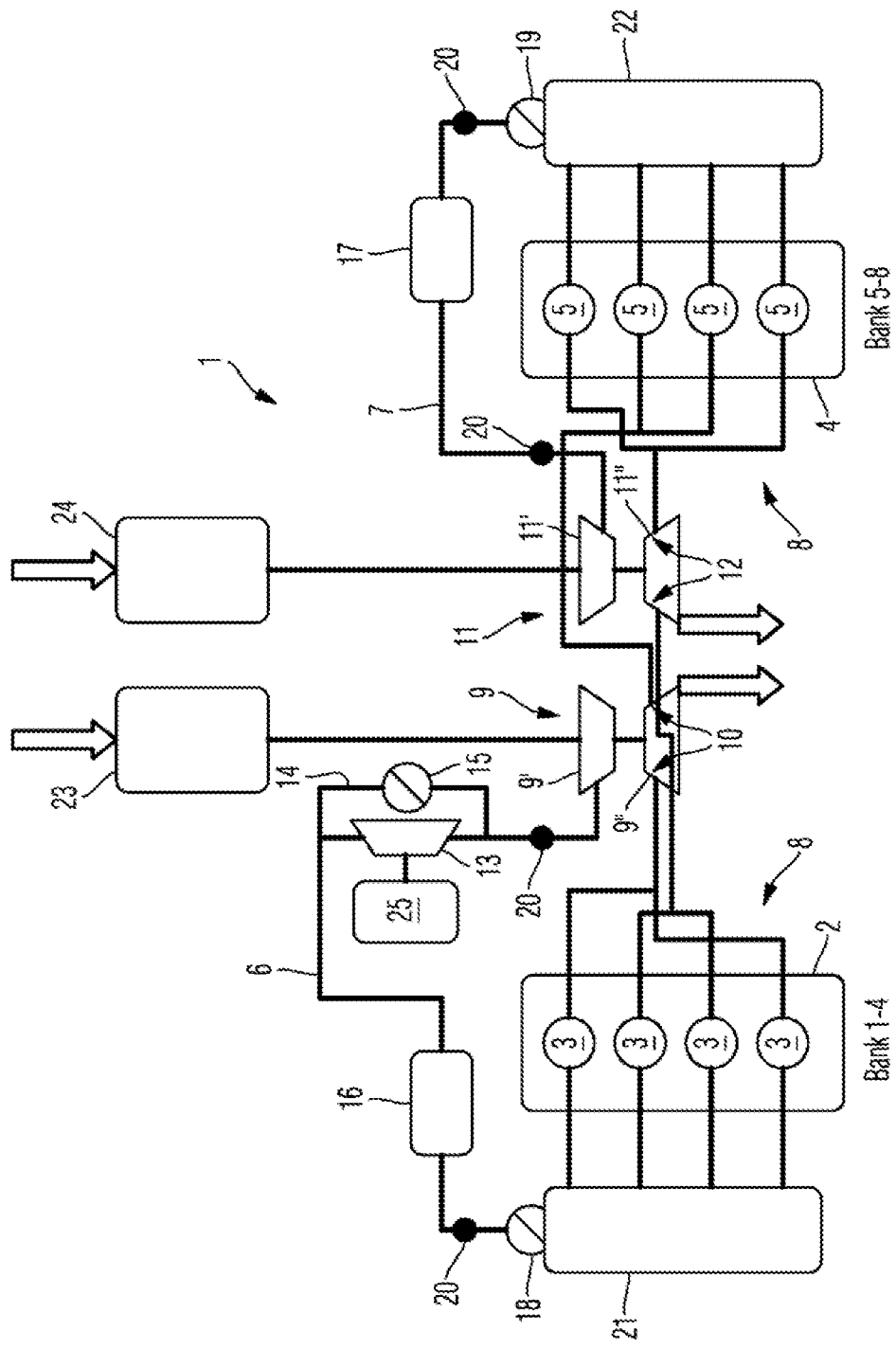
FIG. 1 is a schematic diagram of an internal combustion engine according to an embodiment of the invention with eight cylinders in a V-type construction.

FIG. 1 schematically shows an internal combustion engine 1 with eight cylinders in a V-type construction. The internal combustion engine 1 has a first cylinder bank 2 with four first cylinders 3 and a second cylinder bank 4 with four second cylinders 5. The first cylinder bank 2 and the second cylinder bank 4 are situated opposite one another as per the prior art.

Furthermore, a first fresh-gas line 6 is provided for the first cylinder bank 2, and a second fresh-gas line 7 is provided for the second cylinder bank 4. The first fresh-gas line 6 is supplied with fresh air via a first intake silencer 23 by way of a first compressor 9' of a first exhaust-gas turbocharger 9. An inflow direction of the fresh air is denoted by an arrow. Furthermore, the second fresh-air line 7 is supplied with fresh gas via a second intake silencer 24 by way of a second compressor 11' of a second exhaust-gas turbocharger 11. An inflow direction of the fresh air is again denoted by an arrow.

The first fresh-gas line 6 opens into a first air manifold 21, from which the fresh air is conveyed to the first four cylinders 3. The second fresh-gas line 7 opens into a second air manifold 22, from which fresh gas is fed to the four second cylinders 5.

Furthermore, the internal combustion engine 1 has an exhaust system 8, having the first exhaust-gas turbocharger 9, with the first compressor 9' and a first turbine 9" with two first exhaust-gas inlets 10 and a second exhaust-gas turbocharger 11 with the second compressor 11' and a second turbine 11" with two further second exhaust-gas inlets 12.

The first fresh-gas line 6 is, downstream of the first compressor 9' in a flow direction of the fresh gas, connectable in fresh-gas-conducting fashion to the first four cylinders 3, wherein the fresh-gas connection is realized by use of gas exchange valves. The second fresh-gas line 7 is, downstream of the second compressor 11' in the flow direction of the fresh gas, likewise connectable in fresh-gas-conducting fashion to the second four cylinders 5, which is likewise realized by use of gas exchange valves.

Furthermore, a first cylinder 3 and a second cylinder 5 are connectable in exhaust-gas-conducting fashion via the exhaust system 8 to the first first exhaust-gas inlet 10. A first cylinder 3 and a second cylinder 5 are connectable in exhaust-gas-conducting fashion via the exhaust system 8 to the second first exhaust-gas inlet 10. A first cylinder 3 and a second cylinder 5 are connectable in exhaust-gas-conducting fashion via the exhaust system 8 to the first second exhaust-gas inlet 12. A first cylinder 3 and a second cylinder 5 are connectable in exhaust-gas-conducting fashion via the exhaust system 8 to the second second exhaust-gas inlet 12. The exhaust manifold described here is a so-called bank-spanning manifold. This means that each exhaust-gas turbocharger can be impinged on with exhaust gas from each cylinder bank. An exhaust gas flowing out of the turbines 9, 11 is illustrated by two arrows.

According to the invention, a single third compressor 13 for the first cylinder bank 2 is provided between the first compressor 9' and the first four cylinders 3 in the first fresh-gas line 6.

By way of the embodiment according to the invention, it is possible to omit a second third compressor because, by use of the bank-spanning manifold, both turbines 9", 11" of the first and of the second exhaust-gas turbocharger 9, 11 can be impinged on with exhaust gas exclusively from the first cylinder bank 2. By means of this measure, the response of the internal combustion engine 1 is considerably improved, wherein, at the same time, costs for a second third compressor are saved, along with considerable packaging advantages.

The third compressor 13 particularly preferably has a bypass 14, in which a throttle element 15, such as for example a throttle flap, is arranged. By means of this embodiment, the third compressor 13 can be bypassed, such that it does not constitute an additional flow resistance in the presence of high speeds and high loads of the internal combustion engine.

Furthermore, a first charge-air cooler 16 is arranged in the first fresh-gas line 6 between the third compressor 13 and the first four cylinders 3, and a second charge-air cooler 17 is arranged in the second fresh-gas line 7 between the second compressor 11' and the four second cylinders 5. By means of this measure, the compressed, hot fresh air is cooled, leading to a much higher degree of charging for the cylinders 3, 5, for more power and torque.

Furthermore, in the present exemplary embodiment, a first check valve 18 is arranged in the first fresh-gas line 6 between the first charge-air cooler 16 and the four first cylinders 3, and a second check valve 19 is arranged in the second fresh-gas line 7 between the second charge-air cooler 17 and the four second cylinders 5. This prevents fresh gas from flowing back into the first fresh-gas line 6 and the second fresh-gas line 7 owing to the charge exchange.

In the present exemplary embodiment, the third compressor 13 is electrically driven by an electric motor 25, which is preferably operated with a voltage of 48 V, though a voltage of, for example, 12 V is also possible. In a further exemplary embodiment, the drive of the third compressor 13 may also be realized mechanically or electromechanically.

A temperature and/or pressure sensor 20 is arranged in the first fresh-gas line 6 between the first charge-air cooler 16 and the first check valve 18. In each case one further temperature and/or pressure sensor 20 is arranged, between the first compressor 9' and the third compressor 13 and between the second compressor 11' and the second charge-air cooler 17 respectively, as well as between the second charge-air cooler 17 and the second check valve 19, in the fresh-gas lines 6, 7.

The first cylinder bank 2 has the cylinders 1 to 4, and the second cylinder bank 4 has the cylinders 5 to 8, in accordance with the general numbering of cylinders for V8 internal combustion engines. In the present exemplary embodiment, the following ignition sequence from cylinder to cylinder is present: 1, 5, 4, 8, 6, 3, 7, 2.

Figure 2:
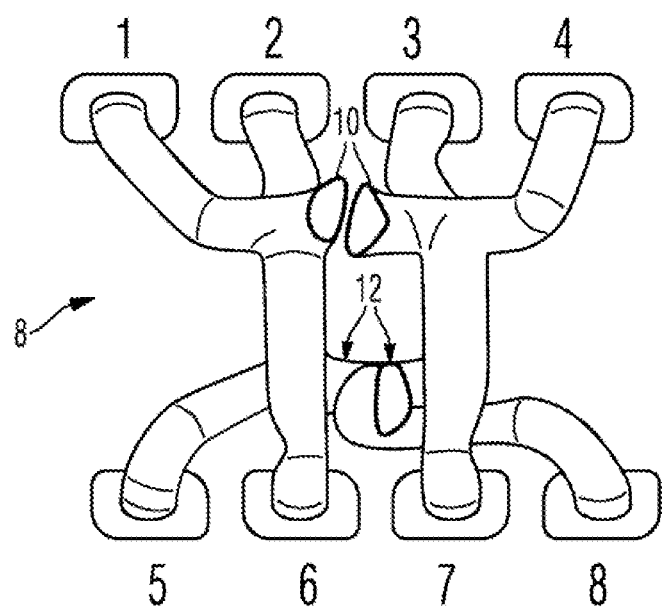
FIG. 2 shows an associated exhaust manifold.

For an internal combustion engine 1 of V-type construction according to the invention with eight cylinders and the stated ignition sequence, FIG. 2 shows a bank-spanning manifold of the exhaust system 8. The cylinders corresponding to the manifold are numbered 1 to 8; it is possible to clearly see the two first exhaust-gas inlets 10 and the two second exhaust-gas inlets 12 for in each case one exhaust-gas turbocharger 9, 11.

Owing to the embodiment according to the invention, the supercharging of the internal combustion engine 1 according to the invention with a single electrical compressor, the third compressor 13, is possible in the case of a V8 internal combustion engine with bank-spanning manifold, because both cylinder banks 2, 4 are "drawn up" simultaneously.

LIST OF REFERENCE DESIGNATIONS

1. Internal combustion engine
2. First cylinder bank
3. First cylinder
4. Second cylinder bank
5. Second cylinder
6. First fresh-gas line
7. Second fresh-gas line
8. Exhaust system
9. First exhaust-gas turbocharger
9'. First compressor
9". First turbine
10. First exhaust-gas inlet
11. Second exhaust-gas turbocharger
11'. Second compressor
11". Second turbine
12. Second exhaust-gas inlet
13. Third compressor
14. Bypass
15. Throttle element
16. First charge-air cooler
17. Second charge-air cooler
18. First check valve
19. Second check valve
20. Temperature and/or pressure sensor
21. First air manifold
22. Second air manifold
23. First intake silencer
24. Second intake silencer
25. Electric motor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine of V-type construction, comprising:
    a first cylinder bank with four first cylinders and a second cylinder bank with four second cylinders;
    a first fresh-gas line for the first cylinder bank and a second fresh-gas line for the second cylinder bank;
    an exhaust system with a first exhaust-gas turbocharger with a first compressor in the first fresh-gas line and a first turbine with a first first exhaust-gas inlet and a second first exhaust-gas inlet, and a second exhaust-gas turbocharger with a second compressor in the second fresh-gas line and a second turbine with a first second exhaust-gas inlet and a second second exhaust-gas inlet, wherein
        the first fresh-gas line is, downstream of the first compressor in a flow direction of a fresh gas, connectable in fresh-gas-conducting fashion solely to the first four cylinders,
        the second fresh-gas line is, downstream of the second compressor in the flow direction of the fresh gas, connectable in fresh-gas-conducting fashion solely to the second four cylinders,
        a first cylinder and a second cylinder of the four first cylinders are connectable in exhaust-gas-conducting fashion via the exhaust system to the first first exhaust-gas inlet,
        a first cylinder and a second cylinder of the four second cylinders are connectable in exhaust-gas-conducting fashion via the exhaust system to the second first exhaust-gas inlet,
        a third cylinder and a fourth cylinder of the four first cylinders are connectable in exhaust-gas-conducting fashion via the exhaust system to the first second exhaust-gas inlet,
        a third cylinder and a fourth cylinder of the four cylinders of the second cylinders are connectable in exhaust-gas-conducting fashion via the exhaust system to the second second exhaust-gas inlet;
    a single third compressor arranged in the first fresh-gas line, between the first compressor and the first four cylinders.

2. The internal combustion engine according to claim 1, wherein
    the third compressor has a bypass.

3. The internal combustion engine according to claim 2, wherein
    a throttle element is arranged in the bypass.

4. The internal combustion engine according to claim 1, wherein
    a first charge-air cooler is arranged in the first fresh-gas line between the third compressor and the first four cylinders.

5. The internal combustion engine according to claim 4, wherein
    a second charge-air cooler is arranged in the second fresh-gas line between the second compressor and the four second cylinders.

6. The internal combustion engine according to claim 5, wherein
    a first check valve is arranged in the first fresh-gas line between the first charge-air cooler and the four first cylinders.

7. The internal combustion engine according to claim 6, wherein
    a second check valve is arranged in the second fresh-gas line between the second charge-air cooler and the four second cylinders.

8. The internal combustion engine according to claim 1, wherein the third compressor is drivable electrically and/or mechanically.

* * * * *